United States Patent
Tang (10) Patent No.: US 10,554,388 B2
(45) Date of Patent: Feb. 4, 2020

(54) SERVICE EXECUTION METHOD AND DEVICE

(71) Applicant: Alibaba Group Holding Limited, George Town (KY)

(72) Inventor: Qiang Tang, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/507,896

(22) Filed: Jul. 10, 2019

(65) Prior Publication Data

US 2019/0334699 A1    Oct. 31, 2019

Related U.S. Application Data

(63) Continuation of application No. PCT/CN2018/087601, filed on May 21, 2018.

(30) Foreign Application Priority Data

May 22, 2017    (CN) .......................... 2017 1 0362074

(51) Int. Cl.
*H04L 9/06*    (2006.01)
*H04L 29/08*   (2006.01)
*H04L 9/08*    (2006.01)

(52) U.S. Cl.
CPC .......... *H04L 9/0637* (2013.01); *H04L 9/0861* (2013.01); *H04L 67/325* (2013.01); *H04L 67/10* (2013.01); *H04L 2209/38* (2013.01)

(58) Field of Classification Search
CPC ...................................................... H04L 9/637

(Continued)

(56) References Cited

U.S. PATENT DOCUMENTS

2009/0157855 A1    6/2009  Adam et al.
2016/0028552 A1    1/2016  Spanos et al.
(Continued)

FOREIGN PATENT DOCUMENTS

CN    105096132    11/2015
CN    105160572    12/2015
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Jacob Lipman
(74) *Attorney, Agent, or Firm* — Fish & Richardson P.C.

(57) ABSTRACT

After receiving a qualification acquisition request sent by an end-user device, a service platform can return a block generation rule to the end-user device, instead of returning the block generation rule only when a predetermined moment arrives. Even if the end-user device sends the qualification acquisition request to the service platform before the predetermined moment, the service platform still returns the block generation rule. The service platform can separate, in terms of time, users who participate in obtaining service qualification, so that some users can obtain the block generation rule before the predetermined moment, and then participate in a service based on the obtained block generation rule when the predetermined moment arrives. Access pressure faced by the service platform when the predetermined moment arrives is relieved, and normal running of the service platform after the predetermined moment arrives is ensured.

9 Claims, 5 Drawing Sheets

(58) Field of Classification Search
 USPC .......................................................... 713/189
 See application file for complete search history.

(56) References Cited

U.S. PATENT DOCUMENTS

| 2016/0283920 | A1 | 9/2016 | Fisher et al. |
| 2017/0046792 | A1 | 2/2017 | Haldenby et al. |
| 2017/0132630 | A1 | 5/2017 | Castinado et al. |
| 2017/0330159 | A1* | 11/2017 | Castinado .............. G06Q 20/02 |
| 2018/0294955 | A1* | 10/2018 | Rhie ..................... H04L 9/0637 |

FOREIGN PATENT DOCUMENTS

| CN | 105976248 | 9/2016 |
| CN | 105991731 | 10/2016 |
| CN | 106202505 | 12/2016 |
| CN | 106411777 | 2/2017 |
| CN | 106446067 | 2/2017 |
| CN | 106504174 | 3/2017 |
| CN | 106603698 | 4/2017 |
| CN | 106651332 | 5/2017 |
| CN | 107395664 | 11/2017 |
| TW | 200937328 | 9/2009 |
| TW | 201705016 | 2/2017 |

OTHER PUBLICATIONS

Nakamoto, "Bitcoin: A Peer-to-Peer Electronic Cash System," www.bitcoin.org, 2005, 9 pages.
PCT International Search Opinion and Search Report in International Application No. PCT/CN2018/087601, dated Jul. 30, 2018, 9 pages (with partial English translation).
International Preliminary Report on Patentability in International Application No. PCT/CN2018/087601, dated Nov. 26, 2019, 10 pages (with English Translation).

* cited by examiner

SERVICE EXECUTION METHOD AND DEVICE

CROSS-REFERENCE TO RELATED APPLICATIONS

This application is a continuation of PCT Application No. PCT/CN2018/087601, filed on May 21, 2018, which claims priority to Chinese Patent Application No. 201710362074.3, filed on May 22, 2017, and each application is hereby incorporated by reference in its entirety.

TECHNICAL FIELD

The present application relates to the field of computer technologies, and in particular, to a service execution method and device.

BACKGROUND

With continuous development of computer technologies, a plurality of emerging service patterns appear in succession. These emerging service patterns facilitate users' service execution, and innovation of the patterns brings brand new experience to the users in a service execution process.

Currently, in these emerging service patterns, some services such as a flash sale are particularly attractive and popular. The users can obtain, at a low price through contention in a time specified by the service, a qualification for executing the service.

In practice, when a service platform detects that a current moment is a predetermined moment of a service, a window for participating in a qualification acquisition activity of the service is opened to all users. Correspondingly, all the users can send a qualification acquisition request for the service to the service platform at this time, and the service platform can select several users from the users who send the qualification acquisition request, and grant qualification for executing the service to the selected users.

For example, in a commodity flash sale (the commodity seckill mentioned here is a service provided by the service platform for the users). When finding the commodity flash sale starts (in other words, the predetermined moment of the service arrives) by using an end-user device, all users send a commodity seckill request (namely, the previous qualification acquisition request) to the service platform that provides the commodity flash sale, and the service platform grants, to the first several users who send the commodity seckill request, a qualification for successfully seckilling a commodity (in other words, grants a qualification for executing the service). Certainly, after the commodity flash sale starts, the service platform can first continuously receive commodity seckill requests sent by all the users, and when a deadline for receiving the commodity seckill requests arrives, randomly select several users from the users who send the commodity seckill requests in this period of time, and grant the commodity seckill qualification to the selected users.

Sometimes when the predetermined moment arrives, the service platform instantly receives qualification acquisition requests that are sent by a large number of users for the service. Consequently, the service platform faces a large amount of access pressure in this period of time, which causes an operational fault of the service platform, and reduces service execution efficiency.

SUMMARY

Implementations of the present application provide a service execution system, to alleviate a problem in the existing technology that a service platform faces relatively high access pressure when a predetermined moment arrives.

An implementation of the present application provides a service execution method, including: continuously generating, by a node, first blocks, storing the first blocks on a blockchain, and providing the blockchain for an end-user device that obtains a block generation rule; obtaining, by the end-user device, the block generation rule from a service platform, and generating, based on the blockchain, a preprocessing block that matches the block generation rule; performing, by the end-user device, a consensus procedure on the preprocessing block by using one or more other end-user devices and the node, and storing the preprocessing block on the blockchain as a second block after determining that the consensus on the preprocessing block is achieved; obtaining, by the service platform, at least a part of the blockchain at a current moment from at least one end-user device or at least one node when determining that a predetermined condition is met; determining, by the service platform, a first block from the obtained blockchain at the current moment based on a predetermined moment, and selecting a second block based on the determined first block; and executing, by the service platform, a service based on a user identifier included in the selected second block.

The implementations of the present application provide a service execution method, to alleviate a problem in the existing technology that a service platform faces relatively high access pressure when a predetermined moment arrives.

An implementation of the present application provides a service execution method, where a node continuously generates first blocks, stores the first blocks on a blockchain, and provides the blockchain for an end-user device that obtains a block generation rule, and the method includes: receiving, by a service platform, a qualification acquisition request sent by the end-user device; returning the block generation rule to the end-user device based on the qualification acquisition request, so that the end-user device generates a second block based on the blockchain and the block generation rule, and stores the second block on the blockchain; obtaining at least a part of the blockchain at a current moment from at least one end-user device or at least one node when determining that a predetermined condition is met; determining a first block from the obtained blockchain at the current moment based on a predetermined moment, and selecting a second block based on the determined first block; and executing a service based on a user identifier included in the selected second block.

The implementations of the present application provide a service execution device, to alleviate a problem in the existing technology that a service platform faces relatively high access pressure when a predetermined moment arrives.

An implementation of the present application provides a service execution device, where a node continuously generates first blocks, stores the first blocks on a blockchain, and provides the blockchain for an end-user device that obtains a block generation rule, and the device includes: a receiving module, configured to receive a qualification acquisition request sent by the end-user device; a returning module, configured to return the block generation rule to the end-user device based on the qualification acquisition request, so that the end-user device generates a second block based on the blockchain and the block generation rule, and stores the second block on the blockchain; an acquisition module, configured to obtain at least a part of the blockchain at a current moment from at least one end-user device or at least one node when determining that a predetermined condition is met; a selection module, configured to determine a first block from the obtained blockchain at the current moment based on a predetermined moment, and select a second block based on the determined first block; and an execution module, configured to execute a service based on a user identifier included in the selected second block.

The implementations of the present application provide a service execution method, to alleviate a problem in the existing technology that a service platform faces relatively high access pressure when a predetermined moment arrives.

An implementation of the present application provides a service execution method, where a node continuously generates first blocks, stores the first blocks on a blockchain, and provides the blockchain for an end-user device that obtains a block generation rule, and the method includes: sending, by the end-user device, a qualification acquisition request to a service platform, so that the service platform returns the block generation rule to the end-user device; generating a preprocessing block based on the blockchain and the block generation rule; performing a consensus procedure on the preprocessing block by using one or more other end-user devices and the node, and storing the preprocessing block on which the consensus is achieved on the blockchain as a second block; and when receiving qualification confirmation information sent by the service platform, sending the blockchain at a current moment that is stored by the end-user device to the service platform, so that the service platform executes a service based on a first block and a second block on the blockchain at the current moment.

The implementations of the present application provide a service execution device, to alleviate a problem in the existing technology that a service platform faces relatively high access pressure when a predetermined moment arrives.

An implementation of the present application provides a service execution device, where a node continuously generates first blocks, stores the first blocks on a blockchain, and provides the blockchain for the device that obtains a block generation rule, and the device includes: a sending module, configured to send a qualification acquisition request to a service platform, so that the service platform returns the block generation rule to the device; a generation module, configured to generate a preprocessing block based on the blockchain and the block generation rule; a consensus module, configured to perform a consensus procedure on the preprocessing block by using one or more other end-user devices and the node, and store the preprocessing block on which the consensus is achieved on the blockchain as a second block; and a receiving module, configured to: when receiving qualification confirmation information sent by the service platform, send the blockchain at a current moment that is stored by the device to the service platform, so that the service platform executes a service based on a first block and a second block on the blockchain at the current moment.

At least one of the previous technical solutions used in the implementations of the present application can achieve the following beneficial effects:

In the implementations of the present application, after receiving the qualification acquisition request sent by the end-user device, the service platform can return the block generation rule to the end-user device, instead of returning the block generation rule to the end-user device only when the predetermined moment arrives. Therefore, even if the end-user device sends the qualification acquisition request to the service platform before the predetermined moment, the service platform still returns the block generation rule to the end-user device. In other words, the service platform can separate, in terms of time, users who participate in obtaining service qualification, so that some users can obtain the block generation rule before the predetermined moment, and then participate in a service based on the obtained block generation rule when the predetermined moment arrives.

In addition, when selecting a user who executes the service, the service platform can select the second block by using the first block included on the blockchain as a time reference, and determine, based on the selected second block, the user who executes the service. As such, even if the end-user device can obtain the block generation rule at different time points, to execute the service, the end-user device can generate, based on the time reference (e.g., the first block), a second block that satisfies the block generation rule. Therefore, as such, not only access pressure faced by the service platform when the predetermined moment arrives can be greatly relieved, but also normal running of the service platform after the predetermined moment arrives can be ensured. It can be further ensured that if the user can execute the service by using the end-user device, even if the block generation rule is obtained by using the end-user device before the predetermined moment, the second block that satisfies the block generation rule needs to be generated only when the predetermined moment arrives, thereby ensuring service execution fairness.

BRIEF DESCRIPTION OF DRAWINGS

The accompanying drawings described here are intended to provide a further understanding of the present application, and constitute a part of the present application. The illustrative implementations of the present application and descriptions thereof are intended to describe the present application, and do not constitute limitations on the present application. In the accompanying drawings.

DESCRIPTION OF IMPLEMENTATIONS

Figure 1:
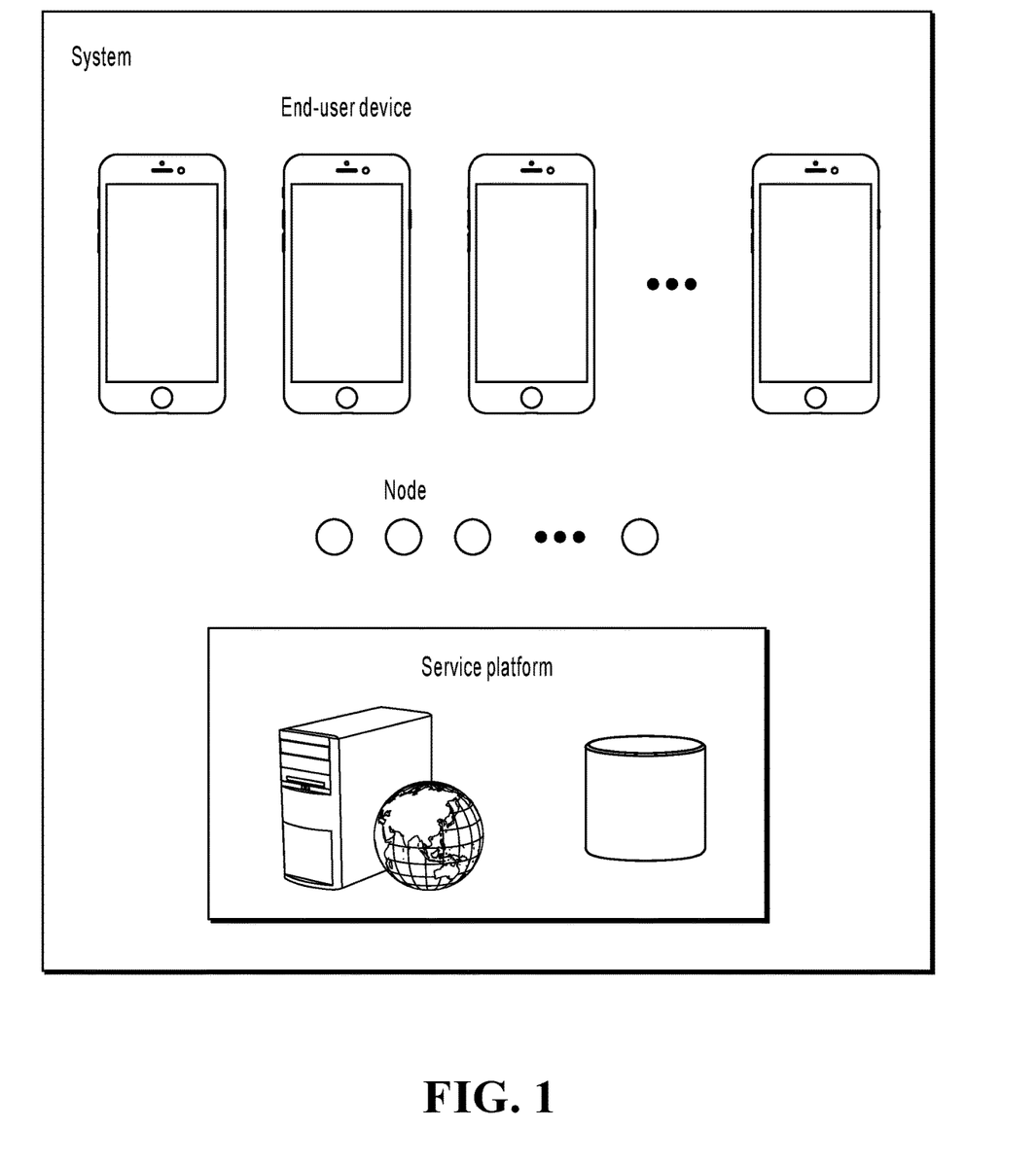
FIG. 1 is a schematic diagram illustrating a service execution system, according to an implementation of the present application.

In the implementations of the present application, a service platform, at least one node, and at least one end-user device can form a service execution system, as shown in FIG. 1.

FIG. 1 is a schematic diagram illustrating a service execution system, according to an implementation of the present application.

In the system shown in FIG. 1, a service platform can provide a user with a to-be-executed service, and return a corresponding block generation rule to an end-user device when receiving a qualification acquisition request for the service that is sent by the user by using the end-user device, so that the end-user device that receives the block generation rule can have an opportunity to execute the service. The service platform later needs to obtain a blockchain from a node or at least one end-user device that sends a qualification acquisition request, and determine a user who executes the service from the blockchain.

There can be at least one node in the system, and these nodes can form a small consensus network. Each node can continuously generate preprocessing blocks, and send the preprocessing blocks generated by the node to the small consensus network for a consensus. Once determining that a consensus on a preprocessing block generated by the node is achieved, the node can store, as a first block, the preprocessing block on a blockchain stored by the node.

The node in the system functions to provide a time reference for the service platform and all end-user devices that participate in a qualification acquisition activity of the service, so that even if the end-user devices obtain the block generation rule from the service platform at different time points, the end-user devices need to generate, based on the same time reference, second blocks that satisfy the block generation rule. As such, fairness of participating in execution of the service by each user can be ensured as much as possible. A reason why a blockchain formed by generating the first block by the node can serve as a time reference is described later.

In the system, if the user wants to participate in the qualification acquisition activity of the service, the user can use an end-user device that is owned by the user to send the qualification acquisition request for the service to the service platform and generate, based on the block generation rule returned by the service platform and the blockchain obtained from the node, a preprocessing block that satisfies the block generation rule. In the present implementation of the present application, the end-user device can send the qualification acquisition request to the service platform at any time point to effectively relieve access pressure faced by the service platform when a predetermined moment arrives. For example, the end-user device can send the qualification acquisition request to the service platform before, when, or after the predetermined moment arrives. However, the service platform can return the block generation rule to the end-user device whenever the service platform receives the qualification acquisition request sent by the end-user device.

First blocks included on the blockchain are obtained by the node by continuously generating preprocessing blocks. To be specific, once a consensus on a preprocessing block generated by the node is achieved, the preprocessing block can be stored on the blockchain as a first block. The node generates the first block not for the service. The first block can be understood as a regular block, and the first block may not include any data about the service.

The second block mentioned above is obtained by the end-user device by generating a preprocessing block. To be specific, once a consensus on a preprocessing block generated by the end-user device based on the blockchain and the block generation rule is achieved, the preprocessing block can be stored on the blockchain as a second block. The second block is generated by the end-user device for the service. In other words, the second block may include data about the service, such as a user identifier. The "first" and "second" here are only used to distinguish between different blocks, and have no special meaning.

To make a person skilled in the art understand the technical solutions in the present application better, the following clearly and comprehensively describes the technical solutions in the implementations of the present application with reference to the accompanying drawings in the implementations of the present application. Apparently, the described implementations are merely some but not all of the implementations of the present application. All other implementations obtained by a person of ordinary skill in the art based on the implementations of the present application without creative efforts shall fall within the protection scope of the present application.

To facilitate description of a service execution method provided in the implementations of the present application, the following describes in detail an entire service execution process in a commodity seckill scenario.

Figure 2:
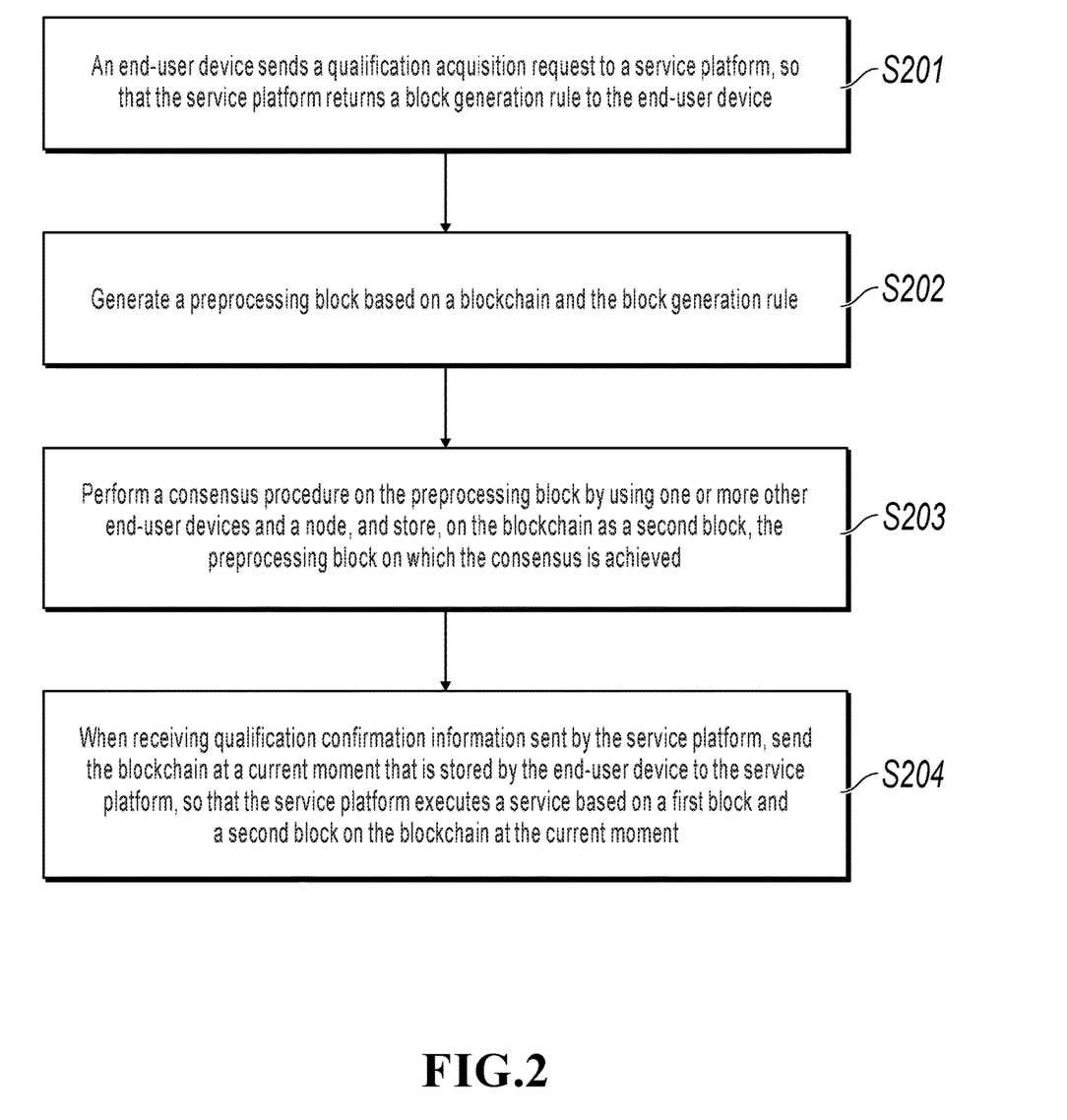
FIG. 2 is a schematic diagram illustrating a service execution process, according to an implementation of the present application.

FIG. 2 is a schematic diagram illustrating a service execution process, according to an implementation of the present application. The service execution process includes the following steps.

S201: An end-user device sends a qualification acquisition request to a service platform, so that the service platform returns a block generation rule to the end-user device.

In the present implementation of the present application, a process in which a user executes a commodity seckill service can be roughly divided into the following two stages:

1. Qualification acquisition stage: In this stage, a user who wants to execute the service can send the qualification acquisition request for the service to the service platform by using an end-user device that is owned by the user. In this stage, the service platform returns the block generation rule to the end-user device when receiving the qualification acquisition request sent by the end-user device, so that the end-user device that obtains the block generation rule can have an opportunity to execute the service, in other words, have an opportunity to seckill a commodity.

2. Qualification confirmation stage: After the qualification acquisition stage, the service platform needs to select, in a certain method, a user who can execute the service from the user who sends the qualification acquisition request in the qualification acquisition stage, and publish the determined user who can execute the service (a user who successfully seckills the commodity).

In the present implementation of the present application, to relieve access pressure faced by the service platform when a predetermined moment of the service arrives, and ensure normal running of the service platform, the service platform can return the block generation rule to the end-user device whenever the service platform receives the qualification acquisition request sent by the end-user device. In other words, the end-user device can obtain the block generation rule from the service platform regardless of whether the user sends the qualification acquisition request to the service platform by using the end-user device before, when, or after the predetermined moment of the service arrives. As such, time points at which end-user devices send the qualification acquisition request to the service platform can be discrete, to effectively relieve the access pressure faced by the service platform when the predetermined moment arrives. The predetermined moment mentioned here can be a start time of the qualification acquisition stage of the service, namely, a start time of a commodity flash sale. When the predetermined moment arrives, the user can participate in the commodity flash sale.

It is worthwhile to note that the end-user device does not truly participate in the commodity flash sale when obtaining the block generation rule before the predetermined moment (namely, the start time of the commodity flash sale) arrives. The end-user device truly participates in the commodity flash sale only when the predetermined moment arrives.

In the present implementation of the present application, a specific method that the end-user device sends the qualification acquisition request for the service (the commodity flash sale) to the service platform before the predetermined moment arrives can be as follows: The service platform can publish information about the service on the service platform before the predetermined moment arrives. When the user starts client software corresponding to the service platform on the end-user device, the end-user device is triggered to send the qualification acquisition request for the service to the service platform, so that the service platform can return the corresponding block generation rule to the end-user device based on the qualification acquisition request sent by the end-user device.

In addition, when the user starts the client software corresponding to the service platform on the end-user device, the user can perform a specified operation in the client, so that the end-user device sends the qualification acquisition request for the service to the service platform after detecting that the user performs the specified operation. For example, assume that after the user starts the client software on the end-user device, the client software can display information about the commodity flash sale and an operation control to the user. When detecting that the user clicks the operation control in the client software, the end-user device can send the qualification acquisition request for the commodity flash sale to the service platform.

Certainly, in the present implementation of the present application, in addition to the previous two cases, the end-user device can be triggered in other methods to send the qualification acquisition request for the service to the service platform. For example, when the client software runs and the end-user device detects that the information about the service (the commodity flash sale) is published in the client software, the end-user device can actively send the qualification acquisition request for the service to the service platform before the predetermined moment of the service arrives. The end-user device can send the qualification acquisition request for the service to the service platform at any moment prior to the predetermined moment or at a moment that is at a distance of specified duration from the predetermined moment.

For another example, the service platform can also select, based on a specific condition, a user who can participate in the commodity flash sale. For example, the service platform can determine a user whose membership level reaches a specified level as a user who can participate in the commodity flash sale, and actively send, to the user by using a user account number, a query message about whether the user needs to participate in the commodity flash sale. When detecting that the user views the query message and determines to participate in the commodity flash sale, the end-user device can send the qualification acquisition request for the commodity flash sale to the service platform. Correspondingly, the service platform can also return the corresponding block generation rule to the end-user device. In addition, there are other trigger methods. Examples are omitted here for simplicity.

S202: Generate a preprocessing block based on a blockchain and the block generation rule.

In the present implementation of the present application, when determining that the predetermined moment arrives, the end-user device can obtain a blockchain stored by at least one predetermined node at a current moment from the node, and further generate, based on the blockchain, a preprocessing block that satisfies the block generation rule.

In the present implementation of the present application, when determining that the predetermined moment of the service arrives, the end-user device needs to obtain the blockchain from the at least one predetermined node because the end-user device can obtain the block generation rule for the service (the commodity flash sale) from the service platform before the predetermined moment, and after obtaining the block generation rule, the end-user device can immediately start to generate the preprocessing block that satisfies the block generation rule. As such, before the predetermined moment, the end-user device can complete generation of the preprocessing block that satisfies the block generation rule. When the predetermined moment arrives, the end-user device directly sends the generated preprocessing block to a consensus network for a consensus. In other words, compared with an end-user device that obtains the block generation rule after the predetermined moment, the end-user device that preferentially obtains the block generation rule before the predetermined moment can preferentially send, in a method of "first obtaining and first generation" to the consensus network for a consensus, the preprocessing block that is generated by the end-user device and that satisfies the block generation rule.

However, for the end-user device that obtains the block generation rule after the predetermined moment, when an actual computing capability of the end-user device is not considered, a time when the end-user device obtains the block generation rule is later than a time when the end-user device obtains the block generation rule before the predetermined moment. Therefore, the end-user device that obtains the block generation rule after the predetermined moment can also be likely to generate a preprocessing block later than the end-user device that obtains the block generation rule before the predetermined moment. Correspondingly, the end-user device also sends, later than the end-user device that obtains the block generation rule before the predetermined moment, the preprocessing block generated by the end-user device to the consensus network for a consensus.

Therefore, if it cannot be ensured that all end-user devices (including both the end-user device that obtains the block generation rule before the predetermined moment and the end-user device that obtains the block generation rule after the predetermined moment) start to generate, at the same time (or the same time reference) as much as possible, the preprocessing block that satisfies the block generation rule, there is a very large probability that the end-user device that first obtains the block generation rule can first generate, in the method of "first obtaining and first generation" described above, the preprocessing block that satisfies the block generation rule, so that a probability of executing the service (namely, a probability of seckilling the commodity) by the end-user device is improved to a certain extent. Consequently, fairness in execution of the service is missing.

To effectively alleviate the previous problem, in the present implementation of the present application, the at least one node can be predetermined, and these nodes can continuously generate preprocessing blocks over time, and store a preprocessing block on which a consensus is achieved on a blockchain of the node as a first block. In other words, it is equivalent that these nodes form a small consensus network. Each node can continuously generate preprocessing blocks not for the service, and send the generated preprocessing blocks to the small consensus network for a consensus. After the small consensus network achieves a consensus on a preprocessing block, each node in the small consensus network can also store the preprocessing block on the blockchain of the node as a first block.

A reason why a time reference can be achieved by the first block generated by the node is as follows: In practice, each block on the blockchain includes a header hash of a previous block. Therefore, when the end-user device can generate, based on a blockchain stored by these nodes, the preprocessing block that satisfies the block generation rule, if the end-user device generates, before the predetermined moment of the service, the preprocessing block that satisfies the block generation rule, a block (the block may be a first block, or may be a second block) corresponding to a header hash of a previous block included in the preprocessing block is necessarily a block generated before the predetermined moment on the blockchain. Therefore, once a consensus on the preprocessing block is achieved, the preprocessing block is necessarily connected after the block, and these nodes still continuously generate preprocessing blocks, and connect a preprocessing block on which a consensus is achieved to the preprocessing block (generated by the end-user device) as a first block.

Therefore, to reduce an occurrence rate of a case that the end-user device that obtains the block generation rule before the predetermined moment can have a higher probability of executing the service (seckilling the commodity) than the end-user device that obtains the block generation rule after the predetermined moment, to determine the user who can execute the service, the service platform can obtain, by using the predetermined moment as a boundary, a latter part of a blockchain from a blockchain obtained from each end-user device (an end-user device that obtains the block generation rule at this time) or the node, and use the latter part of the blockchain as the blockchain for determining the user who can have an opportunity to execute the service.

In such a case, if the end-user device completes, before the predetermined moment of the service, generation of the preprocessing block that satisfies the block generation rule, because the block corresponding to the header hash of the previous block included in the preprocessing block is located in the block generated before the predetermined moment on the blockchain, even if the end-user device sends the preprocessing block to the consensus network for a consensus only when the predetermined moment arrives, the preprocessing block is necessarily connected after the block (namely, the previous block) as a second block after the consensus on the preprocessing block is achieved, and therefore, the second block is very likely to fall into the part before the predetermined moment on the blockchain. Correspondingly, in the qualification confirmation stage, the service platform can ignore the part before the predetermined moment on the blockchain, so that processing previously performed by the end-user device is useless.

Therefore, if the end-user device that obtains the block generation rule before the predetermined moment arrives wants to execute the service, when determining that the current moment is the predetermined moment of the service, the end-user device needs to obtain the blockchain stored by the node at the current moment from the predetermined node, so that only a preprocessing block that is generated by the end-user device based on the blockchain and that satisfies the block generation rule can be selected by the service platform after a consensus on the preprocessing block is achieved, and there is a probability that the end-user device (namely, a user who owns the end-user device) that generates the preprocessing block can execute the service (seckill the commodity).

In the present implementation of the present application, after obtaining the blockchain stored at the current moment from the at least one predetermined node, the end-user device can further determine a block feature value of a last block on the blockchain at the current moment, generate, based on the block feature value, a user identifier, and an adjustment parameter, a to-be-verified feature value that satisfies the block generation rule, and further generate, based on the generated to-be-verified feature value, the user identifier, the block feature value, and the adjustment parameter, the preprocessed block that satisfies the block generation rule.

The feature value (including both the block feature value and the to-be-verified feature value) mentioned above can uniquely identify a block, to ensure uniqueness of the block on the blockchain. The block feature value mentioned here can be understood as the header hash of the previous block, and the to-be-verified feature value can be understood as a header hash of the preprocessing block. In the present implementation of the present application, the block feature value can exist in a form in addition to a form of a hash value. For example, if a message-digest algorithm 5 (MD5) is used, the block feature value can exist in a form of an MD5 value. Certainly, correspondingly, the to-be-verified feature value can also exist in the form of the MD5 value. A specific form of the feature value can be determined based on a specific asymmetric encryption algorithm, provided that the obtained feature value is unique.

The user identifier mentioned above is a user identifier (such as a user account number or an identity card number) used when the user generates the preprocessing block by using the end-user device. The service platform later needs to determine, by using a user identifier included in the second block on the blockchain, the user who can execute the service (namely, the user who successfully seckills the commodity). Therefore, when generating the preprocessing block, the end-user device needs to write the user identifier into the preprocessing block as content included in the preprocessing block.

The adjustment parameter mentioned above is used to make the to-be-verified feature value generated by the end-user device based on the block feature value, the user identifier, and the adjustment parameter satisfies the block generation rule. For example, assume that the block generation rule specifies that the to-be-verified feature value generated by the end-user device needs to be a hash value whose first eight bits are 0. If the to-be-verified feature value generated by the end-user device based on the block feature value (namely, the hash value of the previous block), the user identifier, and one randomly selected adjustment parameter does not meet the requirement, the end-user device can continuously adjust the adjustment parameter, so that after several times of adjustment, the end-user device can obtain a to-be-verified feature value whose first eight bits are 0 based on the block feature value, the user identifier, and the adjustment parameter.

After generating the to-be-verified feature value that satisfies the block generation rule, the end-user device can further generate, based on the generated to-be-verified feature value, the user identifier, the block feature value, and the finally obtained adjustment parameter, the preprocessing block that satisfies the block generation rule, and further send the preprocessing block to the consensus network for a consensus in a later process.

S203: Perform a consensus procedure on the preprocessing block by using one or more other end-user devices and a node, and store the preprocessing block on which the consensus is achieved on the blockchain as a second block.

After generating the preprocessing block that satisfies the block generation rule, the end-user device can send the preprocessing block to the consensus network, to perform the consensus procedure on the preprocessing block by using the consensus network. The consensus network can include each end-user device that obtains the block generation rule at the current moment (namely, an end-user device owned by each user who participates in the commodity flash sale at the current moment) and the at least one predetermined node. Therefore, in a process that the end-user device sends the preprocessing block to the consensus network, the end-user device can first obtain, from the service platform, an address of each end-user device that obtains the block generation rule at the current moment, and then send the preprocessing block to each end-user device for a consensus by using the obtained address.

Addresses of the nodes can be written into the end-user device in advance (or the client software installed on the end-user device). The end-user device can directly send the preprocessing block to the nodes by using the addresses of the nodes that are stored by the end-user device, so that the nodes and each end-user device that obtains the block generation rule at the current moment achieve a consensus on the preprocessing block. Certainly, the end-user device can also obtain the addresses of the nodes from the service platform.

After the consensus network achieves the consensus on the preprocessing block, each end-user device (each end-user device that obtains the block generation rule at the current moment) and the at least one node can store, as a second block, the preprocessing block on a blockchain stored by each end-user device or the at least one node.

It is worthwhile to note that, after the predetermined moment of the service arrives, the at least one predetermined node can participate in a consensus on each preprocessing block generated by each end-user device (namely, the end-user device that obtains the block generation rule). In this process, the nodes can still continuously generate preprocessing blocks, and send the preprocessing blocks to the consensus network for a consensus. The preprocessing block generated by each node in the qualification acquisition stage of the service can be sent to only the other nodes for a consensus, and the preprocessing block is not sent to the end-user device that obtains the block generation rule at the current moment.

Certainly, when the predetermined moment of the service arrives, the service platform can send a message to the predetermined nodes, to instruct the nodes to temporarily stop generating the preprocessing block and join in the consensus on the preprocessing block generated by each end-user device that obtains the block generation rule. Correspondingly, in the qualification acquisition stage of the service, all blocks that are connected to the blockchain are generated by each end-user device that obtains the block generation rule.

S204: When receiving qualification confirmation information sent by the service platform, send a blockchain at a current moment that is stored by the end-user device to the service platform, so that the service platform executes a service based on a first block and a second block on the blockchain at the current moment.

When determining that the service meets a predetermined condition, the service platform can obtain a blockchain stored by at least one end-user device or at least one node at the current moment from the end-user device or the node, and determine the user who can execute the service from the blockchain.

The predetermined condition mentioned here can be: monitoring whether the current moment is a deadline of the qualification acquisition stage (namely, a deadline of participating in the commodity flash sale) specified by the service. When determining that the current moment is the deadline of the qualification acquisition stage specified by the service, the service platform can determine that the service meets the predetermined condition, and further obtain the blockchain corresponding to the current moment from at least one end-user device that obtains the block generation rule at the current moment or the at least one predetermined node.

In addition, the predetermined condition mentioned here can alternatively be: monitoring whether a number of blocks on the blockchain reaches a predetermined number specified by the service. The service platform can always monitor a number of blocks on a blockchain stored in each end-user device (the end-user device that obtains the block generation rule) or each node. When detecting that the number of blocks on the blockchain reaches the predetermined number specified by the service, the service platform can determine that the service meets the predetermined condition, and then obtain the blockchain from each end-user device or node. The predetermined number specified by the service can be a total number of blocks on the blockchain, or can be a number of blocks that are connected to the blockchain after the predetermined moment of the service. Certainly, the predetermined condition can alternatively exist in another form, and specific content of the predetermined condition can be set by a staff member of the service platform. Examples are omitted here for simplicity.

In a process of obtaining the blockchain, the service platform can send the qualification confirmation information to each end-user device (each end-user device that obtains the block generation rule) or the node, so that when receiving the qualification confirmation information, the end-user device or the node can send, to the service platform, a blockchain that corresponds to the current moment and that is stored by the end-user device or the node, so that the service platform can determine the user who can execute the service from the blockchain.

After receiving the qualification determination information, the end-user device or the node can send the entire blockchain stored by the end-user device or the node at the current moment to the service platform, or can send a part of the blockchain to the service platform. The part of the blockchain that is sent by the end-user device or the node to the service platform can be a part generated after the predetermined moment of the service arrives on the blockchain, for example, a part that includes a preprocessing block on which a consensus is achieved and that is stored by each end-user device or node on the blockchain in a form of a first block or a second block after the commodity flash sale starts, as shown in FIG. 3.

Figure 3:
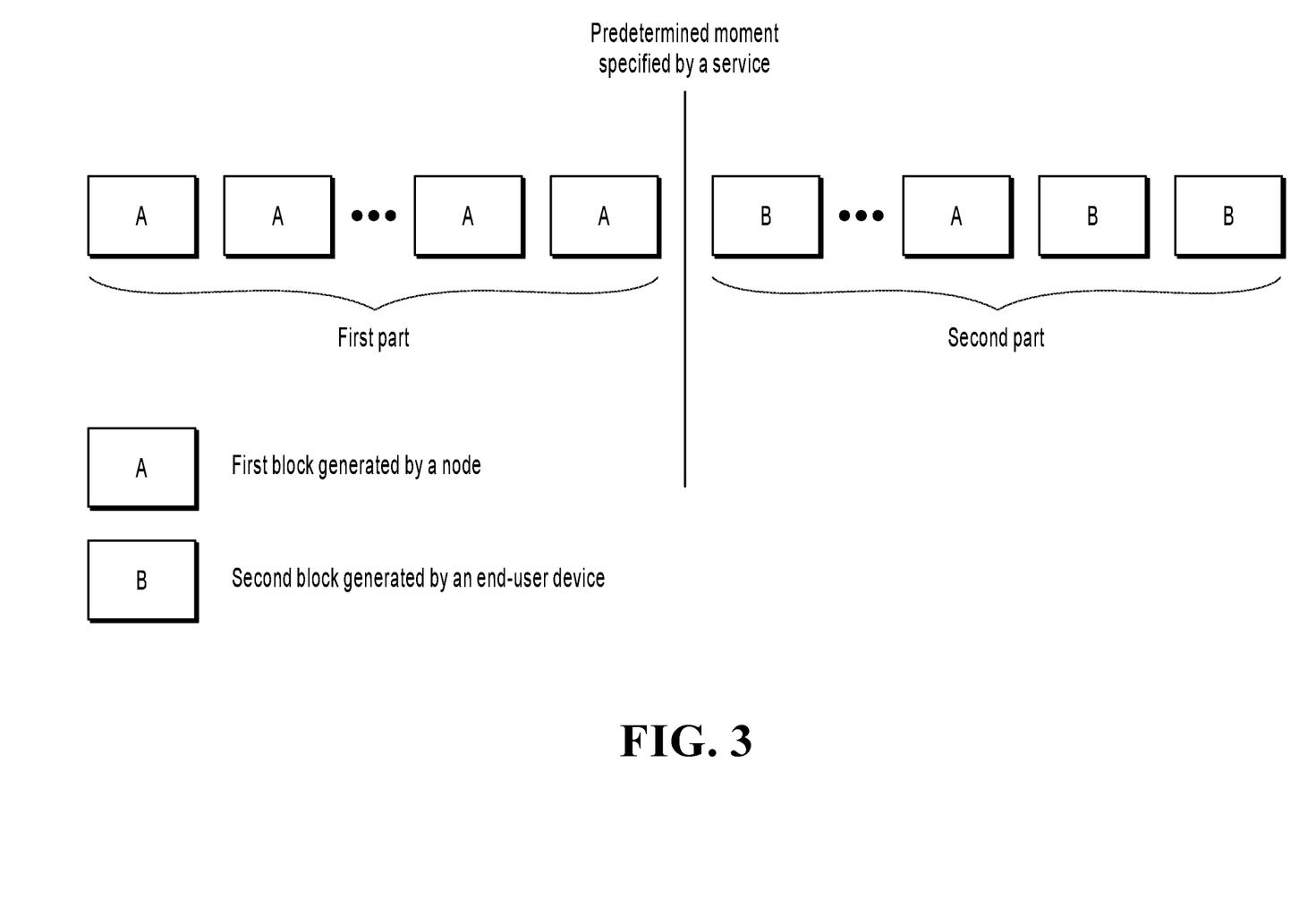
FIG. 3 is a schematic diagram illustrating a part, of a blockchain, generated after a predetermined moment specified by a service, according to an implementation of the present application.

FIG. 3 is a schematic diagram illustrating a part, of a blockchain, generated after a predetermined moment specified by a service, according to an implementation of the present application.

In FIG. 3, the blockchain includes two types of blocks. One type of block is a first block generated by a node, and is denoted as A, and the other type of block is a second block generated by an end-user device, and is denoted as B. The blockchain can be divided into two parts: One part of the blockchain is formed before the predetermined moment specified by the service, and can be referred to as a first part. In the first part, most blocks are first blocks (namely, blocks A) generated by the node. The other part of the blockchain is a part of the blockchain formed after the first part of the blockchain, namely, a part of the blockchain formed by generating a preprocessing block by the end-user device or the node after the predetermined moment specified by the service arrives, and can be referred to as a second part. In the second part, some blocks are obtained by the node by generating a first block (namely, block A), and the other blocks are obtained by the end-user device by generating a second block (namely, block B).

Based on this, after receiving qualification confirmation information sent by a service platform, the end-user device or the node can send the second part of the blockchain to the service platform, and the service platform can determine, based on the obtained part of the blockchain, a user who executes the service.

Certainly, the end-user device or the node can also randomly select a part of the first part of the blockchain for obtaining, and send the other part of the blockchain (including a part of the first part and the entire second part) to the service platform.

After obtaining the blockchain, the service platform can determine one first block from the blockchain based on the predetermined moment, and select a second block from the blockchain based on the determined first block. In the present implementation of the present application, each first block can include a generation time of the first block. Because blocks on the blockchain are sequentially connected in a time sequence, the service platform can determine generation times of all the first blocks from the blockchain, further determine a first block whose generation time is closest to the predetermined moment, and then determine the first block as a marked block.

It is worthwhile to note that in the present implementation of the present application, when determining the marked block, the service platform can divide the obtained blockchain into two parts by using the predetermined moment as a boundary. Each block included in one part is a block generated before the predetermined moment (for example, a block included in the first part in FIG. 3), and each block in the other part is a block generated after the predetermined moment (for example, a block included in the second part in FIG. 3). The service platform can determine a first block whose generation time is closest to the predetermined moment from the other part, and determine the first block as the marked block.

After determining the marked block, the service platform can select at least one second block located after the marked block from the blockchain, and further determine, based on a user identifier included in the selected at least one second block, a user who can execute the service (a user who has an opportunity to seckill a commodity). The service platform can first select each second block located after the marked block (the second block mentioned here is a block generated by each end-user device in a qualification acquisition stage). Then, a predetermined number of first ranked second blocks are selected in a ranking sequence of blocks on the blockchain, and then the user who executes the service is determined (namely, a user who successfully seckills the commodity is determined) based on a user identifier included in the predetermined number of second blocks.

The service platform can directly select a predetermined number of blocks located after the marked block in a ranking sequence of blocks on the blockchain after determining the marked block. When selecting the predetermined number of blocks, each time the service platform encounters a block, the service platform can determine whether the block is a first block or a second block. When the block is a first block, the service platform does not select the first block, and jumps to the next block, and when determining that the block is a second block, the service platform selects the block. In other words, the service platform needs to select the predetermined number of first ranked second blocks after the marked block in such a method.

After selecting the predetermined number of second blocks from the blockchain, the service platform can further determine user identifiers included in the second blocks, and further determine the user who can execute the service.

It is worthwhile to note that in the present implementation of the present application, after obtaining the blockchain from each end-user device or node, the service platform can determine a main chain from the blockchain, and determine, based on the main chain, the user who can execute the service. In the present implementation of the present application, the service platform can determine the longest chain from the obtained blockchain, and determine the longest chain as the main chain.

Correspondingly, after determining the main chain from the obtained blockchain, the service platform determines, from the main chain, a first block whose generation time is closest to the predetermined moment, and determines the first block as the marked block. Then, the service platform selects the predetermined number of second blocks located after the marked block from the main chain in the ranking sequence of blocks on the main chain, and then determines, based on user identifiers included in the selected second blocks, the user who executes the service.

Certainly, in the present implementation of the present application, a staff member of the service platform can set a qualification acquisition rule for the service, and the qualification acquisition rule can specify how a user can have an opportunity to execute the service. For example, for a commodity seckill service, a qualification acquisition rule corresponding to the service specifies one or more blocks that satisfy the qualification acquisition rule on a blockchain later stored by each end-user device. In other words, the qualification acquisition rule specifies one or more blocks, generated by a user by using the end-user device in the users who obtain a block generation rule, that satisfies the qualification acquisition rule.

The staff member of the service platform can formulate a plurality of qualification acquisition rules for the service with reference to an actual situation, so that the service platform can later determine a second block that satisfies the qualification acquisition rules from the obtained blockchain based on the qualification acquisition rules, instead of only using the predetermined number of first ranked second blocks located after the marked block on the blockchain as a basis for determining a "prize-winning" user (the "prize-winning" user is the user who successfully seckills the commodity). As such, after the predetermined moment of the service arrives, the user who later obtains the block generation rule also has an opportunity to execute the service, so that the service brings better user experience to the user.

In the present implementation of the present application, after receiving a qualification acquisition request for the service sent by the end-user device, the service platform can return a block generation rule corresponding to the service and the qualification acquisition rule to the end-user device. After obtaining the qualification acquisition rule, the end-user device can store the qualification acquisition rule. Certainly, the service platform can separately send the block generation rule and the qualification acquisition rule to the end-user device. For example, after receiving the qualification acquisition request sent by the end-user device, the service platform can return only the block generation rule to the end-user device, and can send the qualification acquisition rule to each end-user device in a unified time period.

The end-user device stores the qualification acquisition rule, so that after determining, in a qualification confirmation stage, at least one user who can execute the service, the service platform can publish a user identifier (namely, a user identifier of the user who can execute the service) included in at least one selected second block. Correspondingly, the end-user device can verify, by using the qualification acquisition rule stored by the end-user device, the user identifier published by the service platform, to determine whether a user corresponding to the user identifier is qualified to execute the service.

It can be seen from the previous method that the service platform can separate, in terms of time, users who participate in obtaining service qualification, so that some users can obtain the block generation rule before the predetermined moment, and then participate in the service based on the obtained block generation rule when the predetermined moment arrives. In addition, when selecting the user who executes the service, the service platform can select the second block by using the first block included on the blockchain as a time reference, and determine, based on the selected second block, the user who executes the service. As such, even if the end-user device can obtain the block generation rule at different time points, to execute the service, the end-user device needs to generate, based on the time reference (e.g., the first block), a second block that satisfies the block generation rule.

Therefore, as such, not only access pressure faced by the service platform when the predetermined moment arrives can be greatly relieved, but also normal running of the service platform after the predetermined moment arrives can be ensured. It can be further ensured that if the user can execute the service by using the end-user device, even if the block generation rule is obtained by using the end-user device before the predetermined moment, the second block that satisfies the block generation rule needs to be generated only when the predetermined moment arrives, thereby ensuring service execution fairness.

It is worthwhile to note that when detecting that the current moment is the predetermined moment of the service, the service platform can obtain the blockchain from the node, determine the last block on the blockchain at the current moment, and then determine the block as a marked block. Then, when detecting that the service meets a predetermined condition, the service platform can obtain a blockchain at this time from the node or the end-user device, and determine each block located after the marked block on the blockchain at this time. The service platform can mark each block after the marked block, to determine the user who executes the service. A difference between the marked block mentioned here and the previous marked block is that the previous marked block is determined based on the first block. However, on the blockchain obtained by the service platform at the predetermined moment, the last block on the blockchain may be a first block or may be a second block. Therefore, the marked block mentioned here can be obtained based on the first block or can be obtained based on the second block.

The service execution method described above can be applied to both a commodity seckill scenario and a service scenario such as a license-plate lottery or a prize draw. Examples are omitted here for simplicity. Correspondingly, because the service execution method can be applicable to a plurality of service scenarios similar to a commodity seckill, the predetermined moment mentioned above can be another time. For example, the predetermined moment can also be a deadline of the qualification acquisition stage of the service. Correspondingly, when detecting that the current moment is the predetermined moment, the service platform can determine a first block whose generation time is closest to the predetermined moment, and determine the determined first block as a marked block. Then, the service platform can further determine each second block that is located before the marked block on the blockchain, and select a predetermined number of second blocks that are closest to the marked block in the second blocks in a ranking sequence of the second blocks on the blockchain, to determine, by using the selected second blocks, the user who executes the service.

It is worthwhile to further note that, in the present implementation of the present application, all end-user devices or nodes can generate preprocessing blocks at the same moment, but consensuses on all preprocessing blocks are achieved at different times. Based on this, when each end-user device or node performs a consensus procedure on the preprocessing block generated by the end-user device, the end-user device or the node can add a time stamp to the preprocessing block after determining that the consensus on the preprocessing block is achieved. The time stamp indicates a time when the consensus on the preprocessing block is achieved. As such, when each end-user device or node later stores preprocessing blocks that include a time stamp on the blockchain as second blocks, the end-user device or the node can sort the second blocks in a time sequence, so that the second blocks are ranked on one chain as much as possible, thereby reducing a possibility of generating a branch chain on the blockchain. Certainly, after a consensus on a preprocessing block generated by the node is achieved, a time stamp can be added to the preprocessing block, and the preprocessing block is stored on the blockchain in a form of a first block in a time sequence.

The service execution method provided in the implementations of the present application is described above. Based on the same idea, the implementations of the present application further provide two service execution devices, as shown in FIG. 4 and FIG. 5.

Figure 4:
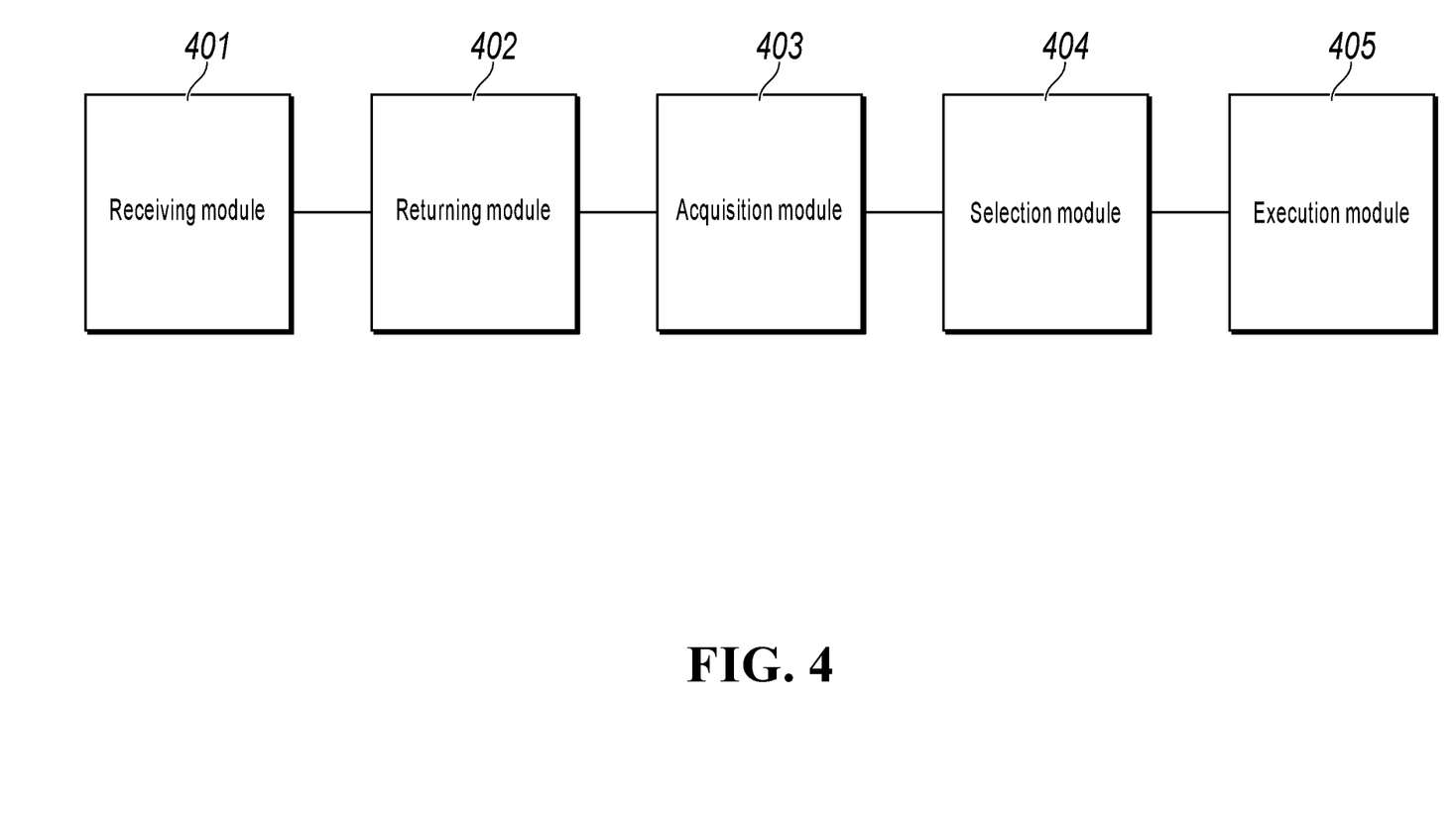
FIG. 4 is a schematic diagram illustrating a service execution device, according to an implementation of the present application.
Figure 5:
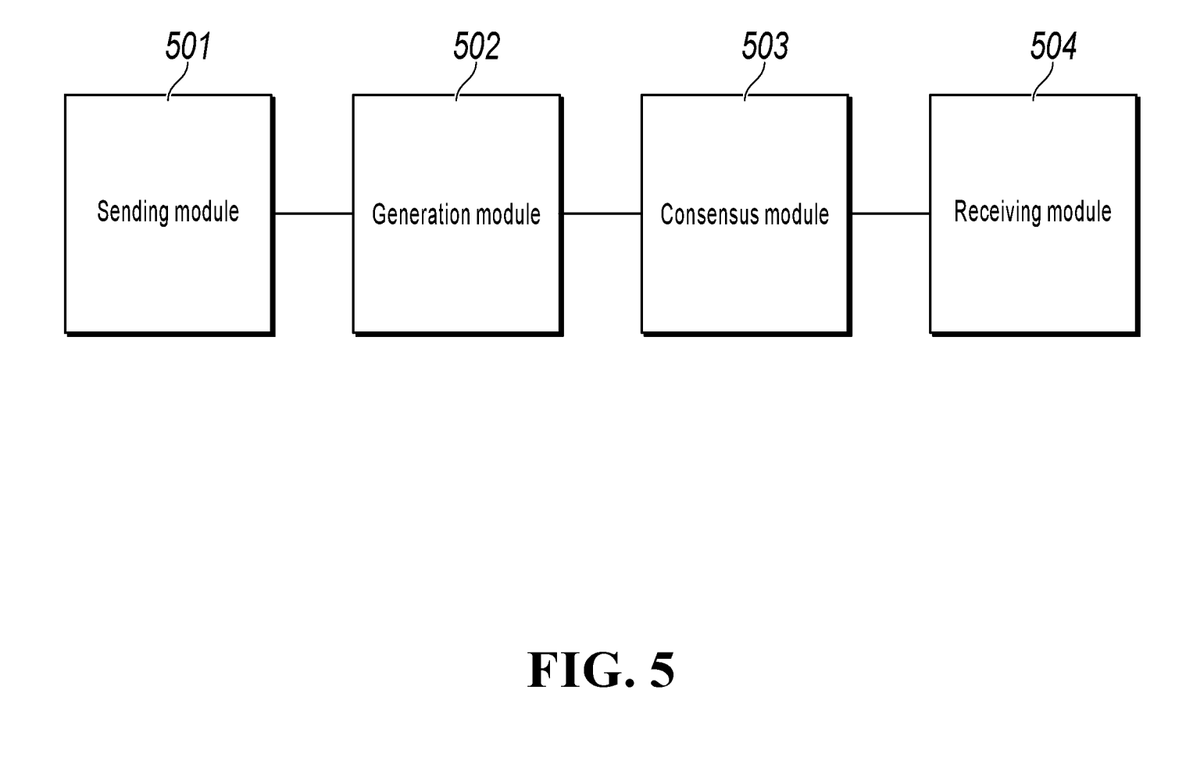
FIG. 5 is a schematic diagram illustrating another service execution device, according to an implementation of the present application.

FIG. 4 is a schematic diagram illustrating a service execution device, according to an implementation of the present application. The device includes: a receiving module 401, configured to receive a qualification acquisition request sent by an end-user device; a returning module 402, configured to return a block generation rule to the end-user device based on the qualification acquisition request, so that the end-user device generates a second block based on a blockchain and the block generation rule, and stores the second block on the blockchain; an acquisition module 403, configured to obtain at least a part of the blockchain at a current moment from at least one end-user device or at least one node when determining that a predetermined condition is met; a selection module 404, configured to determine a first block from the obtained blockchain at the current moment based on a predetermined moment, and select a second block based on the determined first block; and an execution module 405, configured to execute a service based on a user identifier included in the selected second block.

The selection module 404 is configured to determine generation times of all the first blocks on the blockchain; determine a first block whose generation time is closest to the predetermined moment, and determine the first block as a marked block; and select a second block that is located after the marked block from the obtained blockchain at the current moment.

The selection module 404 is configured to select a predetermined number of second blocks that are located after the marked block from the blockchain at the current moment in a ranking sequence of blocks on the blockchain at the current moment.

FIG. 5 is a schematic diagram illustrating another service execution device, according to an implementation of the present application. The device includes: a sending module 501, configured to send a qualification acquisition request to a service platform, so that the service platform returns a block generation rule to the device; a generation module 502, configured to generate a preprocessing block based on a blockchain and the block generation rule; a consensus module 503, configured to perform a consensus procedure on the preprocessing block by using one or more other end-user devices and a node, and store the preprocessing block on which the consensus is achieved on the blockchain as a second block; and a receiving module 504, configured to: when receiving qualification confirmation information sent by the service platform, send the blockchain at a current moment that is stored by the device to the service platform, so that the service platform executes a service based on a first block and a second block on the blockchain at the current moment.

The generation module 502 is configured to determine a block feature value of the last block on the blockchain; determine an adjustment parameter, so that a to-be-verified feature value generated by using the adjustment parameter, the block feature value, and a user identifier satisfies the block generation rule; and generate the preprocessing block based on the to-be-verified feature value, the block feature value, the adjustment parameter, and the user identifier.

In the present implementation of the present application, after receiving the qualification acquisition request sent by the end-user device, the service platform can return the block generation rule to the end-user device, instead of returning the block generation rule to the end-user device only when the predetermined moment arrives. Therefore, even if the end-user device sends the qualification acquisition request to the service platform before the predetermined moment, the service platform still returns the block generation rule to the end-user device. In other words, the service platform can separate, in terms of time, users who participate in obtaining service qualification, so that some users can obtain the block generation rule before the predetermined moment, and then participate in the service based on the obtained block generation rule when the predetermined moment arrives.

In addition, when selecting a user who executes the service, the service platform can select the second block by using the first block included on the blockchain as a time reference, and determine, based on the selected second block, the user who executes the service. As such, even if the end-user device can obtain the block generation rule at different time points, to execute the service, the end-user device needs to generate, based on the time reference (e.g., the first block), a second block that satisfies the block generation rule. Therefore, as such, not only access pressure faced by the service platform when the predetermined moment arrives can be greatly relieved, but also normal running of the service platform after the predetermined moment arrives can be ensured. It can be further ensured that if the user can execute the service by using the end-user device, even if the block generation rule is obtained by using the end-user device before the predetermined moment, the second block that satisfies the block generation rule needs to be generated only when the predetermined moment arrives, thereby ensuring service execution fairness.

In the 1990s, whether a technical improvement is a hardware improvement (for example, an improvement to a circuit structure such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler (logic compiler)" software. The programming is similar to a software compiler used to develop and write a program. Original code needs to be written in a particular programming language for compilation. The language is referred to as a hardware description language (HDL). There are many HDLs, such as Advanced Boolean Expression Language (ABEL), Altera Hardware Description Language (AHDL), Confluence, Cornell University Programming Language (CUPL), HDCal, Java Hardware Description Language (JHDL), Lava, Lola, MyHDL, PALASM, and Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microcontroller. Examples of the controller include but are not limited to the following microcontrollers: ARC 625D, Atmel AT91SAM, Microchip PIC18F26K20, and Silicone Labs C8051F320. A memory controller can also be implemented as a part of the control logic of the memory. A person skilled in the art also knows that, in addition to implementing the controller by using the computer readable program code only, method steps can be logically programmed to allow the controller to implement the same function in forms of the logic gate, the switch, the application-specific integrated circuit, the programmable logic controller, and the built-in microcontroller. Therefore, the controller can be considered as a hardware component, and devices configured to implement various functions in the controller can also be considered as a structure inside the hardware component. Or the devices configured to implement various functions can even be considered as both software modules implementing the method and a structure inside the hardware component.

The system, device, module, or unit illustrated in the previous implementations can be implemented by using a computer chip or an entity, or can be implemented by using a product having a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the device above is described by dividing functions into various units. Certainly, when the present application is implemented, functions of the units can be implemented in one or more pieces of software and/or hardware.

A person skilled in the art should understand that an implementation of the present disclosure can be provided as a method, a system, or a computer program product. Therefore, the present disclosure can use a form of hardware only implementations, software only implementations, or implementations with a combination of software and hardware. Moreover, the present disclosure can use a form of a computer program product that is implemented on one or more computer-usable storage media (including but not limited to a disk memory, a CD-ROM, an optical memory, etc.) that include computer-usable program code.

The present disclosure is described with reference to the flowcharts and/or block diagrams of the method, the device (system), and the computer program product based on the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the other programmable data processing device generate a device for implementing a specific function in one or more procedures in the flowcharts and/or in one or more blocks in the block diagrams.

These computer program instructions can be stored in a computer readable memory that can instruct the computer or the other programmable data processing device to work in a specific way, so that the instructions stored in the computer readable memory generate an artifact that includes an instruction device. The instruction device implements a specific function in one or more procedures in the flowcharts and/or in one or more blocks in the block diagrams.

These computer program instructions can be loaded onto the computer or another programmable data processing device, so that a series of operation steps are performed on the computer or the other programmable device, thereby generating computer-implemented processing. Therefore, the instructions executed on the computer or the other programmable device provide steps for implementing a specific function in one or more procedures in the flowcharts and/or in one or more blocks in the block diagrams.

In a typical configuration, a computing device includes one or more processors (CPU), one or more input/output interfaces, one or more network interfaces, and one or more memories.

The memory can include a non-persistent memory, a random access memory (RAM), a nonvolatile memory, and/or another form in the computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to a parameter random access memory (PRAM), a static random access memory (SRAM), a dynamic random access memory (DRAM), another category of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible to the computing device. Based on the definition in the present specification, the computer readable medium does not include transitory computer readable media (transitory media) such as a modulated data signal and carrier.

It is worthwhile to further note that, the terms "include", "comprise", or their any other variants are intended to cover a non-exclusive inclusion, so a process, a method, a commodity, or a device that includes a list of elements not only includes those elements but also includes other elements which are not expressly listed, or further includes elements inherent to such a process, method, commodity, or device. Without more constraints, an element preceded by "includes a . . . " does not preclude the existence of additional identical elements in the process, method, commodity, or device that includes the element.

A person skilled in the art should understand that an implementation of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, an optical memory, etc.) that include computer-usable program code.

The present application can be described in the general context of computer executable instructions executed by a computer, for example, a program module. Usually, the program module includes a routine, a program, an object, a component, a data structure, etc. executing a specific task or implementing a specific abstract data category. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are described in a progressive way. For same or similar parts of the implementations, references can be made to the implementations. Each implementation focuses on a difference from other implementations. Particularly, a system implementation is basically similar to a method implementation, and therefore, is described briefly. For related parts, references can be made to related descriptions in the method implementation.

The previous implementations are implementations of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A service execution method, comprising:
continuously generating, by a node, first blocks, storing the first blocks on a blockchain;
providing the blockchain for an end-user device that obtains a block generation rule;
obtaining, by the end-user device, the block generation rule from a service platform;
generating, based on the blockchain, a preprocessing block that matches the block generation rule;
performing, by the end-user device, a consensus procedure on the preprocessing block by using one or more other end-user devices and the node;
storing the preprocessing block on the blockchain as a second block in response to determining that the consensus on the preprocessing block is achieved;
obtaining, by the service platform, at least a part of the blockchain at a current moment from at least one end-user device or at least one node in response to determining that a predetermined condition is met;
determining, by the service platform, a first block from the obtained blockchain at the current moment based on a predetermined moment;
selecting a second block based on the determined first block; and
executing, by the service platform, a service based on a user identifier comprised in the selected second block.

2. A service execution method, wherein a node continuously generates first blocks, stores the first blocks on a blockchain, and provides the blockchain for an end-user device that obtains a block generation rule, and wherein the method comprises:
receiving, by a service platform, a qualification acquisition request sent by the end-user device;
returning the block generation rule to the end-user device based on the qualification acquisition request, so that the end-user device generates a second block based on the blockchain and the block generation rule;
stores the second block on the blockchain;
obtaining at least a part of the blockchain at a current moment from at least one end-user device or at least one node in response to determining that a predetermined condition is met;
determining a first block from the obtained blockchain at the current moment based on a predetermined moment;
selecting a second block based on the determined first block; and
executing a service based on a user identifier comprised in the selected second block.

3. The service execution method according to claim 2, wherein the determining a first block from the obtained blockchain at the current moment based on a predetermined moment, and selecting a second block based on the determined first block comprises:
determining generation times of all the first blocks on the blockchain;
determining a first block whose generation time is closest to the predetermined moment;
determining the first block as a marked block; and
selecting a second block that is located after the marked block from the obtained blockchain at the current moment.

4. The service execution method according to claim 3, wherein the selecting a second block that is located after the marked block from the obtained blockchain at the current moment comprises:
selecting a predetermined number of second blocks that are located after the marked block from the blockchain at the current moment in a ranking sequence of blocks on the blockchain at the current moment.

5. A service execution method, wherein a node continuously generates first blocks, stores the first blocks on a blockchain, and provides the blockchain for an end-user device that obtains a block generation rule, and wherein the method comprises:
sending, by the end-user device, a qualification acquisition request to a service platform, so that the service platform returns the block generation rule to the end-user device;
generating a preprocessing block based on the blockchain and the block generation rule;
performing a consensus procedure on the preprocessing block by using one or more other end-user devices and the node;
storing the preprocessing block on which the consensus is achieved on the blockchain as a second block; and
in response to receiving qualification confirmation information sent by the service platform, sending the blockchain at a current moment that is stored by the end-user device to the service platform, so that the service platform executes a service based on a first block and a second block on the blockchain at the current moment.

6. The service execution method according to claim 5, wherein the generating a preprocessing block based on the blockchain and the block generation rule comprises:
determining a block feature value of the last block on the blockchain;
determining an adjustment parameter, so that a to-be-verified feature value generated by using the adjustment parameter, the block feature value, and a user identifier satisfies the block generation rule; and
generating the preprocessing block based on the to-be-verified feature value, the block feature value, the adjustment parameter, and the user identifier.

7. A service execution device, wherein a node continuously generates first blocks, stores the first blocks on a blockchain, and provides the blockchain for an end-user device that obtains a block generation rule, and wherein the device comprises:
a receiving module, configured to receive a qualification acquisition request sent by the end-user device;
a returning module, configured to return the block generation rule to the end-user device based on the qualification acquisition request, so that the end-user device generates a second block based on the blockchain and the block generation rule, and stores the second block on the blockchain;
an acquisition module, configured to obtain at least a part of the blockchain at a current moment from at least one end-user device or at least one node in response to determining that a predetermined condition is met;

a selection module, configured to determine a first block from the obtained blockchain at the current moment based on a predetermined moment, and select a second block based on the determined first block; and an execution module, configured to execute a service based on a user identifier comprised in the selected second block.

8. The service execution device according to claim 7, wherein the selection module is configured to:

determine generation times of all the first blocks on the blockchain;

determine a first block whose generation time is closest to the predetermined moment;

determine the first block as a marked block; and select a second block that is located after the marked block from the obtained blockchain at the current moment.

9. The service execution device according to claim 8, wherein the selection module is configured to select a predetermined number of second blocks that are located after the marked block from the blockchain at the current moment in a ranking sequence of blocks on the blockchain at the current moment.

\* \* \* \* \*